United States Patent

Tamagaki

[11] Patent Number: 5,999,646
[45] Date of Patent: *Dec. 7, 1999

[54] IMAGE FORMING APPARATUS WITH IMAGE STORAGE AND IMAGE SELECTION BASED ON FEATURE EXTRACTION

[75] Inventor: Akira Tamagaki, Kyoto, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/813,645

[22] Filed: Mar. 7, 1997

[30] Foreign Application Priority Data

Mar. 8, 1996 [JP] Japan .................. P8-051151

[51] Int. Cl.$^6$ .................. G06K 9/00; G06K 9/46; G06K 9/20; H04N 1/46
[52] U.S. Cl. .................. 382/169; 382/112; 382/195; 382/283; 358/538
[58] Field of Search .................. 382/112, 167, 382/168, 169, 170, 171, 173, 176, 180, 190, 191, 195, 274, 282, 283; 358/500, 514, 538, 300, 532

[56] References Cited

U.S. PATENT DOCUMENTS

| | | | |
|---|---|---|---|
| 4,504,972 | 3/1985 | Scherl et al. | 382/171 |
| 4,905,079 | 2/1990 | Hayashi et al. | 358/530 |
| 4,958,221 | 9/1990 | Tsuboi et al. | 358/538 |
| 4,980,760 | 12/1990 | Hiratsuka et al. | 358/532 |
| 5,073,953 | 12/1991 | Westdijk | 382/176 |
| 5,287,204 | 2/1994 | Koizumi et al. | 358/538 |
| 5,856,876 | 1/1999 | Sasanuma et al. | 358/300 |
| 5,859,711 | 1/1999 | Barry et al. | 358/296 |
| 5,872,869 | 2/1999 | Shimizu et al. | 382/282 |
| 5,889,885 | 3/1999 | Moed et al. | 382/172 |

OTHER PUBLICATIONS

M Ohashi, "Image Forming Device", Japanese Laid–Open Patent. Publication No. 6–95463, Laid Open on Apr. 8, 1994.

*Primary Examiner*—Amelia Au
*Assistant Examiner*—Mehrdad Dastouri
*Attorney, Agent, or Firm*—Dike, Bronstein, Roberts & Cushman, LLP; David G. Conlin

[57] ABSTRACT

An image-forming apparatus comprising image input means for inputting image data, storage means for successively storing the image data input by the image input means, on a input image data basis, feature-extracting means for producing histogram data per input image data which is stored in the storage means, and extracting the features of the respective image data on the basis of the histogram data, image-selecting means for selecting an image to be output, on the basis of the extracted features of the images, and image output means for forming the image selected by the image-selecting means on recording paper.

9 Claims, 6 Drawing Sheets

FIG.1A
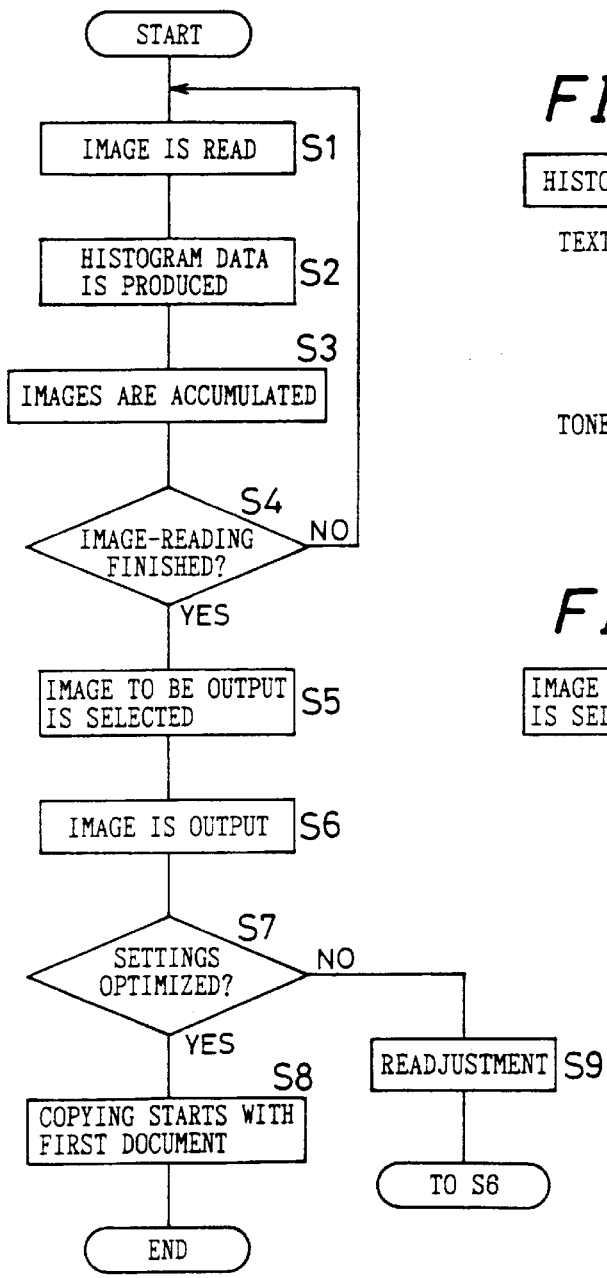
FIG.1B
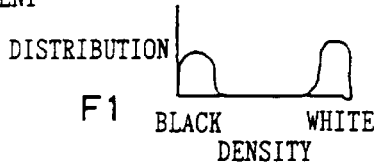
TEXT DOCUMENT
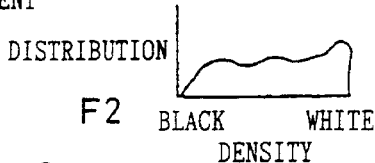
TONE DOCUMENT
FIG.1C
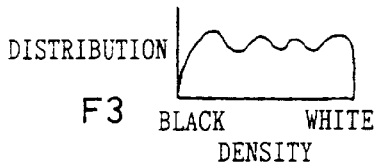
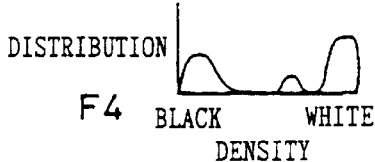
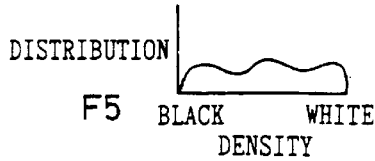
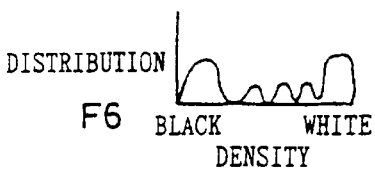

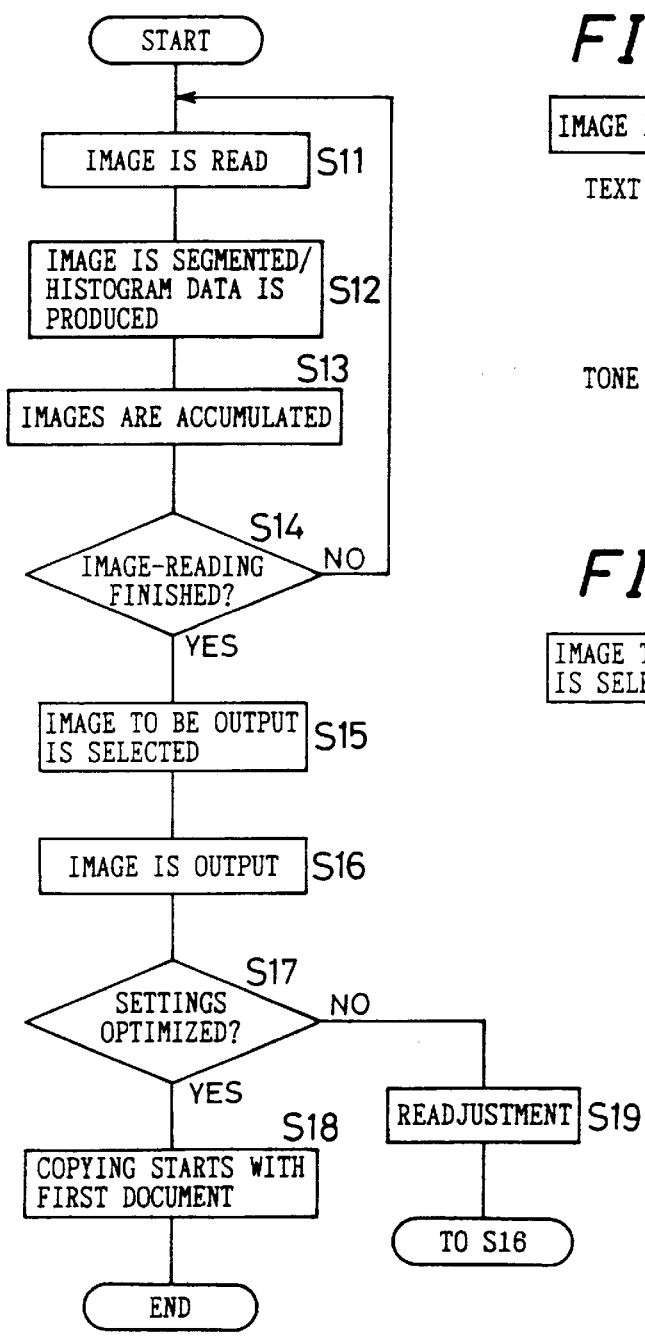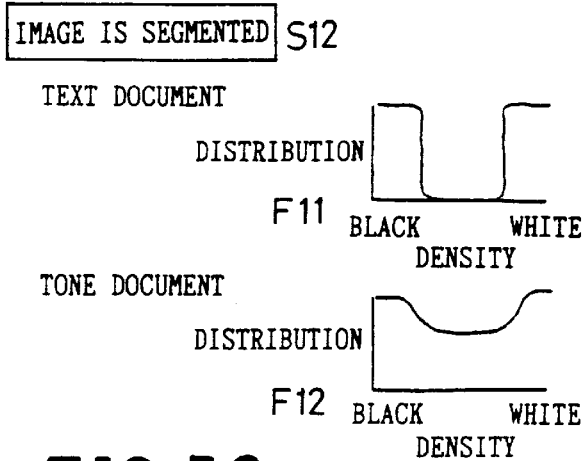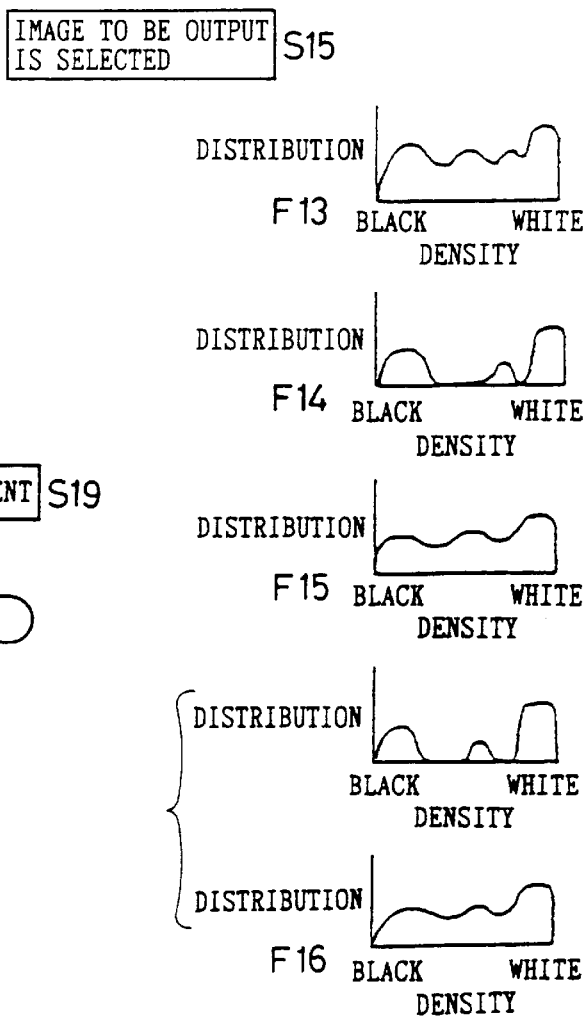

IMAGE FORMING APPARATUS WITH IMAGE STORAGE AND IMAGE SELECTION BASED ON FEATURE EXTRACTION

BACKGROUND OF THE INVENTION

1. Field of the Invention

The present invention relates to an image-forming apparatus for recording digital images, such as a printer or copying machine, which has the function of, prior to outputting the input image data to recording paper for reproduction of the images, extracting characteristic image data from a group of plural image data, and outputting the image data from an output device to facilitate setting the conditions for forming the images.

2. Description of the Related Art

A known image-forming apparatus for reproducing (forming) a desired image on recording paper is designed so that the driving of a semiconductor laser is on/off controlled depending on image data, to irradiate a photoconductor drum as a recording medium with laser light in order to form an electrostatic latent image on the surface of the photoconductor drum which corresponds to the image data, the electrostatic latent image is then made visible by development with a toner as a coloring agent, and the developed image is transferred to a sheet of recording paper which is timely conveyed, to form an image on the sheet of recording paper which is then output outside the apparatus.

The image data may be produced by a variety of methods, including a method in which a document to be copied is read with a scanner, a method in which a personal computer or the like is used to create a graphic, text, etc. as necessary. It is well-known that apparatuses for outputting the image data from personal computers as hard copies of the images are described as "printers", while apparatuses which are integrally equipped with scanners and output data on the images captured by the scanners to record paper for reproduction of the images are referred to as "copying machines".

With prior art image-forming apparatuses for outputting the input image data to recording paper for reproduction of the images as hard copies, test copying may be performed in order to check the output state from the image-forming apparatuses in advance. For example, the image-forming apparatus disclosed in Japanese Unexamined Patent Application Disclosure HEI 6-95463 is designed so that test copying of an image to be output is performed by outputting a test copy of the image to a sheet of recording paper of size smaller than the size of the desired sheet of recording paper. This prevents wastage of recording paper, and allows the user to set (or adjust) the conditions for forming the actual image, for example, to adjust the hue of a colored image or the image density, while visually checking the test copy, in order to output an image conditioned as desired by the user.

With the image-forming apparatuses of the prior art, however, an image corresponding to the image data on the first placed document is usually formed and output as a test copy.

An operation for setting the conditions for adjustment of the densities and hues of the images is performed while visually checking the output image which is formed on the recording paper. Particularly, in cases where the image of the document is not characteristic such that it contains no areas with clear density gradations, however, not only is it impossible to set optimum density conditions by visually checking the test copy, for all the images to be formed, but also the setting operation is very troublesome and requires skills.

These problems are entirely the result of test-copying the document which was selected from the plural documents only for the reason that it was first placed.

Therefore, with the image-forming apparatuses of the prior art, it is impossible to set the conditions as desired by the user for making a test copy; since a document selected only for the reason that it was first placed is reproduced on recording paper, the operation for setting the optimum conditions while visually checking the output image is troublesome. It takes therefore longer to set the conditions, and thus not only does it take a longer time to make the hard copies, but also more test copies are wasted.

In addition, in cases where the image of information to be formed extends over more than one sheet of recording paper, since a test copy is made on the first sheet only, the hard copies of the image will be made under unfavorably adjusted density conditions, with the densities of respective copies not adjusted properly.

SUMMARY OF THE INVENTION

It is an object of the present invention, which has been accomplished to solve the problems described above, to provide an image-forming apparatus which allows easy operation for image adjustment while visually checking a test copy.

In order to accomplish the object, the image-forming apparatus according to the present invention is characterized by comprising image input means for inputting image data; storage means for successively storing the image data input by the image input means on an input image basis; feature-extracting means for extracting the features of the images per input image data which is stored in the storage means; image-selecting means for selecting an image to be output (as a test image), on the basis of the extracted features of the images; and image output means for outputting the image selected by the image-selecting means on recording paper. Here, the constituent members mentioned above are designed so that for setting the conditions for formation of images, including the density adjustment, etc., the user or operator may extract in advance characteristic images suitable for the density adjustment, and the most characteristic image among the extracted characteristic images is output.

This design allows a characteristic image to be selected on the basis of plural image data, and the selected image is output on a sheet of recording paper, for example. The operator can condition the image density, etc. as desired while visually checking the output image. The prior output of a particularly characteristic image selected on the basis of the image data and the visual check of the test-copied image, as mentioned above, help the operator to obtain the images conditioned as desired.

Therefore, histogram data is produced for every image data as the feature-extracting means, and the features of each image data are extracted on the basis of the histogram data. In other words, since the histogram data shows the density profile of each image, the features of the images may be easily extracted.

The image-selecting means is designed to be capable of easily selecting an image with a variety of density gradations which has both a low-density area and a high-density area, an image with an area with density gradations extending over a wide range, or an image with a variously patterned area, on the basis of the histogram data reflecting the features of the images which are extracted by the feature-extracting means. The visual check of the image with a variety of density gradations allows the operator to easily envisage whether the images will be reproduced densely or lightly, for example, and this facilitates setting the conditions so as to reproduce the images conditioned as desired.

An image-forming apparatus which accomplishes the object of the invention and comprises image-reading means for reading original images and capturing the image data;

a storage unit for storing the data on the images read by the image-reading means per original;

an operating unit for setting the conditions for forming images;

image-forming means for successively reading the image data stored in the storage unit and forming images on recording paper under the image-forming conditions set by the operating unit;

image-segmenting means for locating an area characteristic of an image per data on the images read by the reading means, and segmenting the area per data on the images;

image-selecting means for selecting a particularly characteristic image segment on the basis of the features of the image segments provided by the image-segmenting means; and image output means for reading the image selected by the image-selecting means from the storage unit and outputting the selected image by forming the image on recording paper prior to commencement of forming on recording paper images of all the image data stored in the storage unit.

Here, the image-segmenting means is means for segmenting a text image, tone image such as a photo, etc. per image data, and histogram data on the segments of the image are produced for extraction of the features thereof. Since this allows the features of a text image and the features of a photographic image to be extracted separately, the features of the segments of the images may be determined, respectively.

The image segment-selecting means is designed to be capable of easily selecting an image segment with a variety of density gradations by selecting an image segment with a variety of density gradations which has both a high-density area and a low-density area, an image with an area with density gradations extending over a wide range, or an image with a variously patterned area from the image segments provided by the image-segmenting means, on the basis of the histogram data.

In addition, in cases where it is designed so that at least two image segments with different characteristics are selected by the image segment-selecting means from the characteristic image segments located by the image-segmenting means, and the image segments are output to a single sheet of recording paper by the image output means, it is possible to output both a characteristic area of a text image and a characteristic area of a photographic image on a single sheet of recording paper in order to recognize the density profile more accurately and more easily by comparing the densities of the two areas. This also results in more easier and more accurate operation for setting the image density.

Here, in cases where an image-forming mode such as a text mode or photographic mode is selected, the image for making a test copy may be selected depending on the selected mode. That is, the selection of an image depending on the selected mode facilitates setting the conditions suitable for the selected mode.

BRIEF DESCRIPTION OF THE DRAWINGS

Other and further objects, features, and advantages of the invention will be more explicit from the following detailed description taken with reference to the drawings wherein:

FIG. 1A is a control flow chart illustrative of control operation according to a first embodiment of the present invention;

FIG. 1B shows graphs illustrative of the histogram data which is produced in step S2 in the flow chart of FIG. 1A;

FIG. 1C shows graphs illustrative of the histogram data which is used in step S5 in the flow chart of FIG. 1A to determine an image to be output;

FIG. 5A is a control flow chart illustrative of control operation according to a second embodiment of the invention;

FIG. 5B shows graphs illustrative of the histogram data which is produced in step S12 in the flow chart of FIG. 5A;

FIG. 5C shows graphs illustrative of the histogram data which is used in step S15 in the flow chart of FIG. 5A to select an image to be output;

DETAILED DESCRIPTION OF THE PREFERRED EMBODIMENTS

Figure 2:
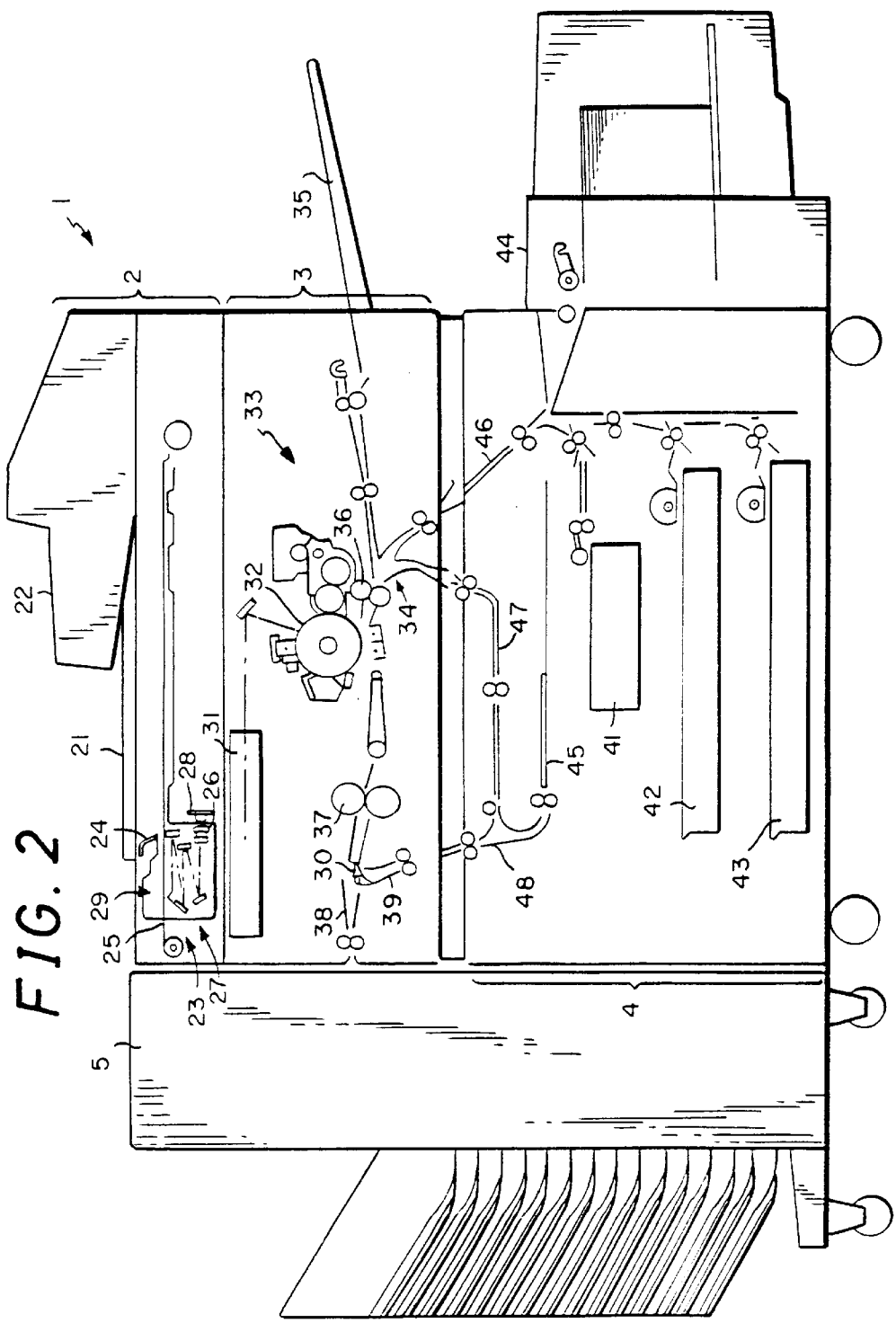
FIG. 2 is a schematic cross-sectional view illustrative of the internal configuration of a digital copying machine as an example of the image-forming apparatus according to the invention.
Figure 3:
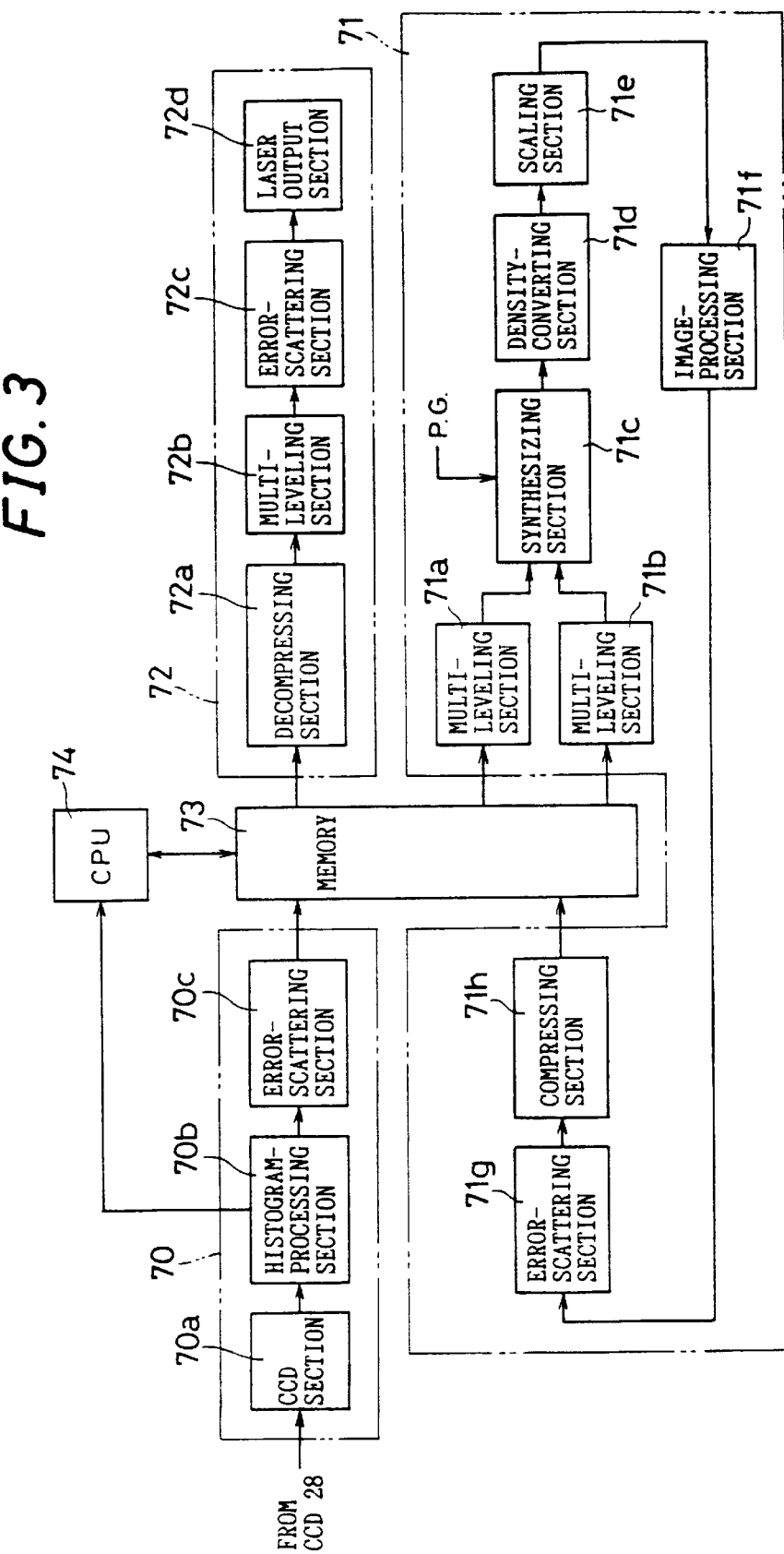
FIG. 3 is a block diagram of an example of the image-processing device mounted in the image-forming apparatus according to the invention.

Embodiments of the present invention will now be described in detail. FIG. 1 is a control flow chart for an image-forming apparatus according to a first embodiment of the present invention, FIG. 2 is a schematic cross-sectional view illustrative of the internal configuration of a digital copying machine which is an example of the image-forming apparatus according to the invention, and FIG. 3 is a block diagram illustrative of the circuit configuration of the image-forming section of the digital copying machine.

The image-forming apparatus according to the invention will now be described with reference to FIG. 2. A digital copying machine 1 illustrated in the drawing is equipped with a scanning unit 2, a laser printing unit 3 and a multistage sheet feed unit 4, and further with a sorter 5 for post-treatment of sheets of recording paper which are ejected outside the apparatus, for example, for collating and stacking sheets of recording paper in groups, if necessary.

The scanning section 2 is constructed of a document table 21 made of a piece of transparent glass, a duplex copying-capable, automatic recirculating document feeder (RDH) 22, a scanning unit 23, etc. The scanning unit 23, a unit for reading original images as digital images, is constructed of an exposure assembly 24 for illuminating the document to be read, an optical system which comprises plural mirrors for reflecting the light reflected from the document toward an exposure area and an image-forming lens, and a CCD 28 which is a read element for photoelectric conversion of the light reflected from the document and focused through the optical system 27.

The RDH 22 is equipped with a document-stacking unit (not shown) capable of holding plural documents at one time, and the documents stacked in the document-stacking unit are conveyed to the image-reading position one by one. Here, the top and bottom sides of the documents conveyed to the reading position can successively be read as necessary. The reading position is provided flush with the document table 21, and a transparent glass plate is placed at the position.

The exposure assembly 24, the optical system 27 and the CCD 28 are supported on the same supporting member 29, and the supporting member 29 is driven to travel in parallel to the underside of the document table 21 at a fixed speed. This results in focusing images of the documents stacked on the document table 21, on the surface of the CCD 28, followed by successive reading of the images. The supporting member 29 moves to the document-reading position in the RDH 22, and remains at that position so that an image of each of the documents which are conveyed via the RDH 22 is formed on the CCD 28 through the optical system 27, and the images of the conveyed documents are to be successively read by the CCD 28. Accordingly, the supporting member 29 is selectively controlled so as to travel along the document table 21 or to move to the document-reading position at the side of the RDH 22, depending on whether the particular document is placed on the document table 21 or in the RDH 22.

Data read from the images of the documents by the CCD 28 are subjected to image processing by an image-forming device illustrated in FIG. 3, so as to allow output thereof for forming images on recording paper by a printing unit 3, and are stored temporarily. This image processing will be described later in detail.

The printing unit 3 is equipped with, as the main components, a laser write unit 31, the driving of which is controlled in response to the input image data which has been processed by the image-processing device, and an image forming unit 33 provided with a photoconductor drum 32 as the recording medium which is irradiated with laser light from the laser write unit 31, and produces hard copies of the image data on the sheets of recording paper which are conveyed as necessary. Specifically, the laser write unit 31 is equipped with a semiconductor laser which outputs laser light depending on the image data, a polygon mirror for polarizing the laser light at a constant angular speed, a correcting f-θ lens for polarizing the constant angular speed-polarized laser light, etc. on the photoconductor drum 32.

The image forming unit 33 is based on the well-known electrophotographic system. Placed around the photoconductor drum 32 in an opposing manner are a charger for uniformly charging the photoconductor 32 to a specific polarity, a developing device for developing the electrostatic latent images which have been formed by irradiation with laser light, a transferring device for transferring the developed images to the sheets of recording paper which are timely conveyed, a cleaning device for removing toner remaining on the surface of the photoconductor drum 32 after transfer, and an antistatic device for removing unnecessary charge remaining on the photoconductor drum 32 for the formation of the next image.

The printing unit 3 is further equipped with a recording paper-conveying system 34 for sending recording paper to the transfer position which is opposed to the transferring device in the image forming unit 33. The conveying system 34, including a manual sheet-feeder table 35 protruding toward the right side of the printing unit 3, has a resist roller 36 to which the recording paper stacked on the sheet-feeder table 35 is fed and which controls the initiation of conveyance of the recording paper in synchronization with the rotation of the photoconductor drum 32, a fixing unit 37 for fixing not-yet-fixed images transferred to the recording paper, and a path selector unit 30 for switching between a path 38 for ejecting the fixed sheets of recording paper outside the printing unit 3 and a path 39 for sending the fixed sheets of recording paper again to the image forming unit 33.

On the other hand, a multistage sheet-feeder unit 4 for successively feeding sheets of recording paper of automatically selected size, which is provided separately from the manual paper-feeder table 35 for sending recording paper to the printing unit 3, is equipped with a first paper feed cassette 41 as a first paper feed unit, a second paper feed cassette 42 as a second paper feed unit and a third paper feed cassette 43 as a third paper feed unit, each of which can be drawn out toward the front in the drawing, and a paper feed tray 44 as a fourth paper feed unit which can be optionally added to the right side of the digital copying machine 1. Separately from the paper feed units mentioned above, an intermediate tray 45 is provided for forming images also on the other side of the sheet of recording paper with images already formed on one side thereof in the printing unit 3.

The multistage paper feed unit 4 is further provided with a merging conveyer path 46 for sending to the conveying system 34 of the printing unit 3 the sheets of recording paper which are selectively fed from the first, second and third paper feed cassettes and the paper feed tray 44 as the fourth paper feed unit, a conveyer path 47 for sending to the conveying system 34 the image-formed sheets of recording paper which are held in the intermediate tray 45, and a multi-copy conveyer path 48 for guiding the image-formed sheets of recording paper which have been sent from the printing unit 3 to the intermediate tray 45 for storage therein.

The merging conveyer path 46, the sending conveyer path 47 and the multi-copy conveyer path 48 are formed in a connecting manner so as to allow recording paper to travel between the paths and the conveying system 34. Here, although not explained above, the multi-copy conveyer path 48 is designed so that recording paper is directly led to the intermediate tray 45 and stored therein in cases where images are formed on both sides of the recording paper, whereas the recording paper bypasses the intermediate tray 45 and is directly guided to the conveyer path 47 when images are formed on the same side thereof. The sending direction of the recording paper guided to the intermediate tray 45 is reversed at the position of the intermediate tray 45 to send the recording paper to the conveyer path 47, and this results in conveyance of the recording paper with the image-formed side placed underneath, to the resist roller 36. In contrast, when recording paper is directly sent to the conveyer path 47 from the multi-copy conveyer path 48, the recording paper is conveyed such that the image-formed side again faces the transferring unit of the image forming unit 33.

A sorter 5 is also provided to receive the sheets of recording paper which are ejected from the printing unit 3 in order to sort and eject the sheets of recording paper to a multistage bin 51, and is used in such a manner as to allow automatic switching between the note mode for collating the sheets of recording paper on the same bin and the stack mode for arranging plural sheets of recording paper for the same document on the same bin.

Since the digital copying machine 1 is configured as described above, when a document to be copied is placed on the document table 21 or in the document-stacking unit of the RDH 22, the scanning unit 2 begins to operate in order to appropriately read an image of the document; the image of the document is read through the CCD 28. The read image is subjected to image processing through the image-processing device illustrated in FIG. 3, and is then sent to the printing unit 3 as data on the recorded image which is output as laser light incident upon the photoconductor drum 32 via the laser write unit 31.

The laser-light irradiation results in the formation of an electrostatic latent image on the surface of the photoconductor drum 32 which matches the data on the recorded image, and the latent image is made visible with toner by the developing device and is electrostatically transferred by the action of the transferring device, to one side of the recording paper which is sent from the multistage paper-feeder unit 4 or the manual paper-feeder table 35. The recording paper with a toner image transferred thereto is separated from the image forming unit 33, more specifically from the surface of the photoconductor drum 32, and is sent to the fixing unit 37 along the conveying system 34, where the not-yet-fixed toner image on the recording paper is fixed, for example, by heat, and then ejected outside the printing unit 3 as a hard copy.

The recording paper is then conveyed to the intermediate tray 45 or the like through selective switching depending on the position of the switching member 30 for formation of another image on the same side or the other side, and then to the image-forming unit 33 again to form the image which is output from the printing unit 3 as a hard copy.

The configuration and function of the image-processing device in the digital copying machine 1 described above with reference to FIG. 2 will now be described with reference to the block diagram in FIG. 3.

The image-processing device mounted in the digital copying machine is equipped with an image data input section 70 for inputting the information read from the CCD 28 illustrated in FIG. 2, an image-processing unit 71 for subjecting the image data from the input unit 70 to image processing, a recorded-image-data output unit 72 for outputting the image-processed data to the printing unit 3, a memory 73 which comprises a RAM, etc. for appropriately storing the input data on the read image and recorded image data for outputting, I/O units 70, 72 for the image data, and a central processing unit (CPU) 74 for controlling the image-processing unit 71 and the memory 73.

The image data input unit 70 is provided for inputting an analog signal produced by photoelectric conversion of the image focused on the CCD 28 illustrated in FIG. 2 and converting the analog quantity into digital binary data, and the data is designed to be stored in the memory 73 after being processed for error scattering, etc.

More specifically, in a CCD section 70a which constitutes the image data input unit 70, the analog potential signals depending on the respective pixel densities in the read-image data are A/D converted into digital quantities and then subjected to the well-known MTF correction, monochrome correction or gamma correction to produce 256-level (8-bit) digital signals which are sent to a next histogram-processing section 70b. Density information (histogram data) is obtained in the histogram-processing section 70b by adding the digital signals output from the CCD section 70a on a 256-level pixel density basis, and the obtained histogram data is sent to the CPU 74 as such or to an error-scattering section 70c as image data, if necessary. In the error-scattering section 70c, the respective 8-bit/pixel digital signals output from the CCD section 70a are converted to bits (binary digits) by error scattering, a form of pseudo halftone processing, that is, the process by which binarization errors are considered when the adjacent pixels are analyzed for binarization, and the bits are redistributed in order to faithfully reproduce the local densities on the document.

The histogram-processing section 70b is means of extracting features of images which are formed according to the invention, and the histogram data produced in the histogram-processing section 70b is sent to the CPU 74 described above, and is stored in the memory 73 if necessary, to be used as the basis on which the image to be test-copied is determined. This will be described in detail later.

The image-processing unit 71 is the processing unit for finally converting the read (input) image data, which has been temporarily stored in the memory 73 via the image data input unit 70, into recorded image data in the form desired by the user; the read image data is converted by the processing unit before it is stored in the memory 73 as the final converted image data for output. The image-processing unit 71 comprises multi-leveling sections 71a, 71b, synthesizing section 71c, density-conversion section 71d, a scaling section 71e, an image-processing section 71f, an error-scattering section 71g and a compressing section 71h. The various sections of the image-processing unit 71 may function when required, and not otherwise.

Specifically, the multi-leveling sections 71a, 71b convert the binary data, which has been obtained in the error-scattering section 70c of the image data input unit 70, back into 256-level digital signals. The data obtained by conversion through the multi-leveling sections 71a, 71b is sent to the synthesizing section 71c as the next stage for synthesizing the data into single image data. Then, in the synthesizing section 71c, a logical operation, that is, an OR, AND or EXCLUSIVE-OR operation is selectively performed on a pixel basis. The data to be operated on here include the input image data which is stored in the memory 73 and bit data from a pattern generator (PG).

In the density-conversion section 71d, the relationship between the input densities and the output densities is set as desired for the 256-level digital signals, by referring to a predetermined level conversion table. For example, by setting the image density to a level desired by the operator, image-density processing which depends on the set density is performed with reference to the level conversion table.

Likewise in the density-conversion section 71d, the data is processed under the scaling condition set by the operator as desired in the scaling section 71e, wherein pixel data (regarding the densities) on the scaled pixels of interest is obtained by interpolation or deletion on the basis of the input data on a known image, and scaling is first performed in the direction of vertical scanning, and then in the direction of horizontal scanning.

The image data input to the image processing section 71f undergoes various types of image processing therein, and information is obtained about the data rows by extracting the features, etc.

The same processing as in the error-scattering section 70c of the image data input unit 70 is performed in the error-scattering section 71g. This means that the error is scattered after the image processing has been performed.

The available storage capacity of the memory 73 is greatly reduced in cases where the processed data is stored in the memory 73 as is. Therefore, in order to prevent this, the binary data is compressed into a well-known coded form such as run length in the compressing section 71h. The compression of the processed image data is performed in the final process loop upon completion of the final image information to be output.

Finally, the image data output unit 72 is constructed of a decompressing section 72a, a multi-leveling section 72b, an error-scattering section 72c and a laser output section 72d. The image data output unit 72 is designed so that the image data which has been compressed as described above and stored in the memory 73, is decompressed and converted back into the original 256-level digital signals which are subjected to error scattering as quad (4-level) data which produces smoother halftones than binary data, and the data is transferred to the laser output section 72d.

In other words, the image data compressed in the compression section 71h of the image-processing unit 71 is restored to the original data before compression. The same processing as in the multi-leveling sections 71a, 71b of the image-processing section 71 is performed in the multi-leveling section 72b, and the same processing as in the error-scattering section 70c of the image data input unit 70 is performed in the error-scattering section 72c.

The data processed as digital pixel data is then converted into on/off signals for the semiconductor laser in the laser output section 72d, in response to the control signals from a sequence controller (not shown). In other words, the signals containing the image information are transmitted to the printing unit 3 as signals which drive the semiconductor laser of the laser write unit 31 illustrated in FIG. 2.

Figure 4:
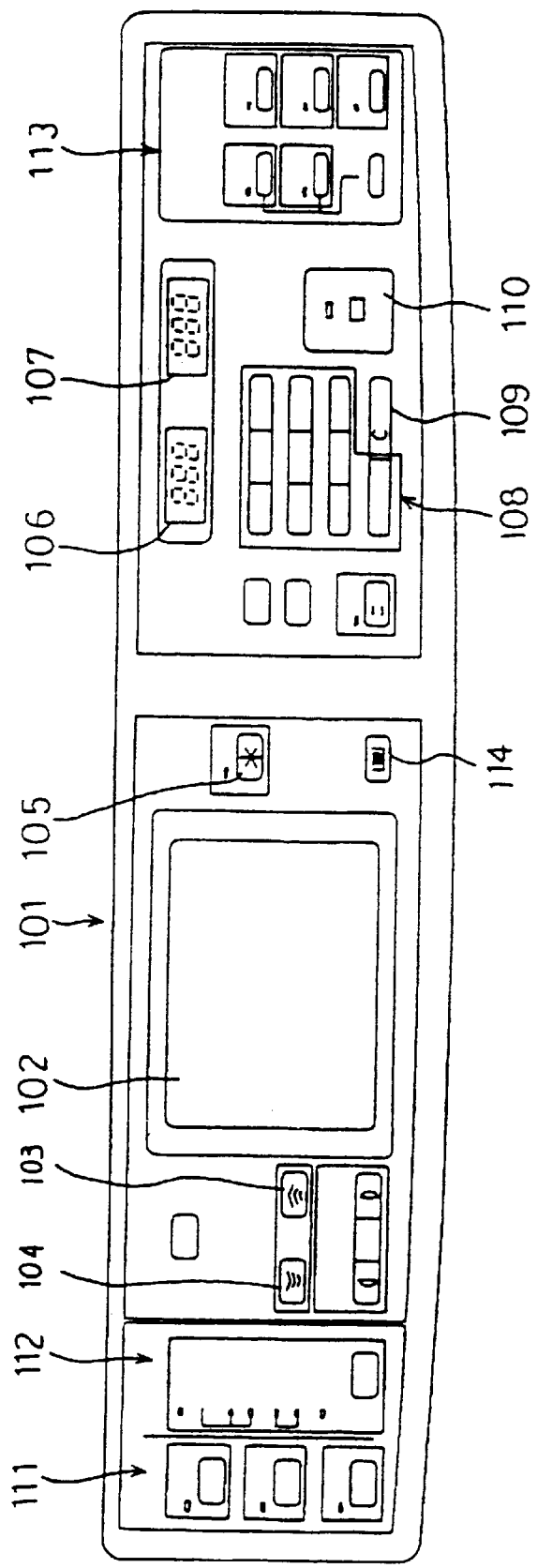
FIG. 4 is a plan view illustrative of a form of the control panel for setting the conditions for forming images according to the invention.

FIG. 4 is an illustration of the control panel for setting the conditions for forming images according to the invention. The illustrated control panel is connected to the image-forming process control unit (not shown) of the printing unit 3, and the process control unit is connected to the CPU 74 illustrated in FIG. 3. More specifically, of the conditions set with the control panel for forming images, the conditions set for the density, scaling, etc. are sent to the CPU 74. This allows the density, magnification, etc. to be adjusted in the image-processing unit 71.

The control panel will now be described briefly with reference to FIG. 4. The control panel is equipped with a display section 102 for displaying the operational contents and other contents one by one, scaling keys 103, 104 for setting the scaling factor, an operation guide key 105 for guiding the operation state, etc. of the copying machine as necessary, a set-number display section 106 for displaying the set number of copies, a copy-count display section 107 for displaying the number of copied sheets, a ten-keypad 108 for setting the number of copies, etc., a clear key 109 for clearing the set number of copies, and a copying start key 110 (start switch) for initiating the copying operation. Also provided on the control panel 101 are a sorter-function-setting section 111 for giving directions such as for stacking, sorting or ejecting copies, a copying-mode-setting section 112 for switching among duplex, simplex and other copying modes such as photo mode for copying original photos and text mode for copying original texts, a function-setting section 113 for setting the function of test copying according to the invention or the function of centering or trimming images. The control panel is further provided with a density-setting key 114 for adjusting image densities according to the invention.

The copying is performed as desired by the operator by appropriately operating the keys on the control panel 101. The setting functions are sent to the CPU 74 illustrated in FIG. 3 by operating the function-setting section 113. The set copying mode such as photo or text mode is sent to the CPU 74 as well. The CPU 74 then directs the image-processing unit 71 to perform image processing in the selected photo or text mode, for example, under the set density and scaling conditions. In addition, when the test-copying function is set by the function-setting section 113, the CPU 74 executes extraction of the features of the read original images, extracted feature-based selection of the image to be enhanced and referred to for setting the copying conditions, etc., then the data of the selected image is output as a test copy via the image data output unit 72.

First Embodiment

A first embodiment of the invention will now be described in detail with reference to FIG. 1A. The first embodiment is for selecting an image from the read images which helps the operator to set the conditions for reproduction of the images in a preparatory stage when original images to be copied are read by the digital machine 1, and the data on the read images is subjected to image processing under conditions set by the user for reproduction of the images. More specifically, the operator operates the various keys on the control panel 101 illustrated in FIG. 4 in order to set the function of outputting a test copy for optimizing the density conditions, for example, by the function-setting section 113.

If the test-copying function has already been set by the function-setting section 113, the digital copying machine 1 reads original images to be copied in order to select an image to be test-copied, and initiates the operation to output a test copy under the conditions set by the operator before hard copies of the images are output on the basis of the data on the read images.

Images of documents to be copied are first read by the scanning unit 2 in succession (step S1), and the data is stored in the memory 73 after having been subjected to image processing illustrated in FIG. 3. The image data is successively stored in the memory 73 on a document basis. Based on the data on the read images, histogram data is prepared for each document by the histogram-processing section 70b of the image data input unit 70 illustrated in FIG. 3 (step S2) and is stored in the memory via the CPU 74 (step S3). The data is stored together with the image data.

When there are plural documents to be copied, the above-described operation is repeated for each of the documents, and upon completion of reading of the image on the final document (step S4), a characteristic image is selected on the basis of the histogram data stored together with the data on the read images (step S5). In other words, in order to extract the features of the respective images on the plural documents in step S2, the above-described histogram data is prepared and stored for each of the documents on the basis of the data on the read images. The features of the image of a text document, for example, are extracted on the assumption that the data is of a text document when the image consists mainly of a black area (text area) and a white area (background), and much of the histogram data is composed of pixels for the black and white areas.

The histogram illustrates the density profile of the image on a document, and the histogram data is produced by counting the pixels for the respective density levels of the entire document. As an example, since the image consists only of a high-density area and a low-density area (of the color of the paper itself, for example, white) when the document is a text document, as described above, the histogram data on the density profile is graphed as illustrated in F1 in FIG. 1B. In contrast, when the original is a tone document such as a photo, the density of the image varies over a wide range of levels, and thus the histogram data as illustrated in F2, for example, is obtained. In the case of a tone document, the density levels vary almost uniformly over a wide range, as illustrated in F2.

Therefore, as described above, the features of the images of the document are extracted to produce histogram data, and an image to be test copied is selected on the basis of the extracted features in step S5. More specifically, histogram data characteristic of a text document or photographic document is selected, and the image matching the data is then selected. For example, one or more types of image are selected considering whether most of the image is black and white as in the case of text documents, and whether the image is a gray-scale one as in the case of tone photos, etc.

When a document bearing a characteristic image is selected in step S5, the data on the read image on the document is subjected to image processing under the conditions preset by the image-processing unit 71, for example, and is output as image data via the image data output unit 72, and a test copy of the image is output by the operation of the processing unit 33 (step S6). Here, the image formation is performed by the processing unit 33 under the conditions preset by the operator. For example, the image processing is performed under conditions set for the density, or the test copy is output under substantially the same conditions as for actual hard copies, including scaling conditions.

The operator visually checks the output test copy, and when it is judged that the density profile of the formed image is satisfactory and thus the set conditions are judged to be optimum, the test-copying function is cleared, and operate copying start switch 110 to initiate the image-forming operation starting with the first document (step S8) in order to output hard copies of all the images of the documents which have been read in step S1. The image formation is actually performed by operation with the copying start switch 110 on the control panel 101.

On the other hand, in cases where the conditions are judged not to be optimum, the density-setting key 114 on the control panel 101 is operated to change the density setting, etc. in step S9 so as to decrease the image density in cases where the density is higher than expected, while referring to the image density of the output test copy. The process then returns to step S6, where the data on the selected image is processed by the image-processing unit 71 using the changed settings and is then output as a test copy again. When the operator judges that the output test copy is in an optimum state, the test-copying function is cleared, and the image-forming operation is initiated as described above in step S8.

Here, when the set conditions are changed in step S9, the foregoing processing may be repeated starting with step S1 without performing test copying in step S6. This, however, wastes the foregoing processing, and thus it is recommended that the process return to step S6 in order to output a test copy using the changed settings. The test copying may be resumed by operation with the start switch 110 while the test-copying function is still set. In other words, so long as the function is set, the operation with the start switch 110 does not result in all the read images being output as hard copies.

As described above, prior to initiation of an ordinary image-forming operation, a characteristic image is selected (extracted) from the images on plural documents, and a test copy of the image is output under set conditions. Since this is the same as output of a hard copy of a characteristic document selected from the plural documents, the conditions may be easily adjusted while visually checking the formed image. For example, since the operator can easily judge whether the density is as expected by visually checking the density profile of the image, the operator can easily and reliably change the settings, for example, increase or decrease the density setting when the density is not as expected.

A detailed explanation will now be given regarding the control in step S5 for selecting a characteristic image on the basis of the histogram data which is produced according to the invention.

Selection of a document bearing an image which is judged to comprise both a high-density area and a low-density area on the basis of the histogram data, and output of a test copy of the image on the document help the operator adjust the density. For example, a document is selected to be one that bears an image with density gradients varying over a wide range, and with both a high-density area and a low-density area, illustrated with the histogram data given in F3 in FIG. 1C. The histogram data illustrated in F3 shows that the image is characterized by having large differences in density between black and white, with halftone areas spreading over a wide range of density levels. Accordingly, in cases where the presence of such a characteristic image matching the histogram data as illustrated in F3 is found, the document bearing the image matching the histogram data is selected in step S5.

In cases where no such appropriate histogram data as illustrated in F3 is present, a search is performed for histogram data characteristic of a text document or the like. For example, feature-extracting histogram data is produced, from which histogram data which clearly reflects the presence of black and white areas and further a light black area is selected in step S5. The histogram data clearly reflects a large difference in density between black and white, and the presence of both a high-density area and a low-density area in a text document. By selecting such image-bearing document and outputting a test copy thereof, the operator can easily adjust the density, etc. More specifically, since the difference in density is clear, it is easy for the operator to adjust the density as desired, depending on the difference in density while referring to the low-density area. Particularly, when the text mode or the like has been set, in order to determine the histogram data matching an appropriate text document and concurrently to facilitate adjusting the density, such histogram data should be selected as illustrated in F4 which corresponds to the image when a low-density area is present, from the histogram data of the plural text documents.

On the other hand, when the photographic mode has been selected for reproducing the gradation, histogram data reflecting clear gradation is selected. Here, as described above, an image is selected to be one that has areas greatly different in density and areas with density gradations over a wide range. It will be understood that the histogram data to be selected is one of such images as illustrated in F5, which indicates that the image has both a high-density area (nearly black area) and a low-density area (nearly white area), and further has halftone areas uniformly spreading all over the image. A document bearing such an image is selected in step S5, a test copy of the image is output, and this helps the operator recognize the difference in density more reliably and more accurately, thus making it easier to adjust the density. Here, the presence of the halftone areas uniformly spreading all over the image is reflected in the histogram data as the presence of data uniformly scattered over a wide range between black and white, as illustrated in the histogram data shown in F5 which includes extracted features.

Here, when the halftone areas lie only over a restricted range, the difference in density is unclear, and this makes it difficult to adjust the density, whereas it is very easy to recognize the difference in density when the halftone areas extend all over the image as illustrated in F5.

The characteristic image is not limited to a text document or photo, and may be a clearly patterned one. For example, the document may be one bearing a calendar with black letters and blue, red and/or otherwise colored patterns on white background paper. With such a document, the histogram data comprises distinct areas which characterize the data. F6 in FIG. 1C is an illustration of the data. The histogram data shows the presence of particular enhanced halftone areas in addition to a white area and a black area. By selecting an original image which matches such data and visually checking an output of the image, the operator can easily set the density. More specifically, the setting of the density is facilitated by referring to the density gradients of the halftone areas. For example, when the halftone areas are desired to be reproduced in a density level closer to black, the density is adjusted by increasing the density level.

As described above, the selection of a document bearing a characteristic image from the plural read documents and output of a test copy of the image on the selected document can be carried out by referring to the histogram data produced by extracting the features of the respective documents. Here, it is desirable to select an image which has not only white and black areas as in a text document, but also areas with clear density gradations, for example, one that produces histogram data as illustrated in F4. It is also desirable to select a clearly patterned image which produces histogram data as illustrated in F6.

Here, in cases where the selected document is a text document which has a background area (e.g., in the color white) and a text area (e.g., in the color black) and produces histogram data as illustrated in F1, the selection of the document and output of a test copy thereof is useless for adjusting the density for reproduction of the halftones. In addition, when all the images read are halftones, it is advisable to select an image which produces histogram data covering all the area. That is, in cases where the halftone areas lie only over a limited range, it is difficult to distinguish the density gradients of the output image, and thus it is important to select a document bearing an image which facilitates drawing a distinction between the density levels. For the foregoing reasons, such a characteristic image as produces histogram data illustrated in F3 through F6 is selected, and a test copy thereof is output.

In addition, in cases where the image of the selected single document cannot satisfy the requirements described above, two documents are selected and test copies thereof are output. For example, when text documents and documents such as photos are mixed, a text document and a document bearing an image with halftone areas lying over the broadest range possible are selected, and a test copy of each of the images on the documents is output. This allows the difference in density between a text-reflecting dense area and a halftone area of a document such as a photo to be clearly recognized, and thus the density is easier to adjust. When a document bearing a halftone is selected, it is desirable for the document to have both a high-density area and a low-density area in order to have as large a difference in density as possible. For example, it is desirable to select an image matching histogram data as illustrated in F4.

Second Embodiment

According to the first embodiment described above, the histogram data reflects the extracted features of all the images on a single document. Therefore, in cases where both a text image and a photographic image, for example, are present on a single document, it may be sometimes difficult to determine which is characteristic, the text image or the photographic image.

Therefore, according to the present or second embodiment, images on a single document are grouped into text images and tone images such as photos, for example, and features of the respective images are extracted to produce histogram data for the respective images which are referred to in order to select an image to be test-copied. This makes it easier to adjust the density by referring to the output state of the test copy prior to the formation of the images. In other words, if the features of all the images on a single document are extracted as a whole to prepare histogram data on a document basis without being grouped in the above case, the histogram data cannot reflect the features of the text document and/or the photographic document, if present, and thus, unlike according to the first embodiment, it is impossible to select a characteristic image.

Here, images are grouped by distinguishing between a text area and a halftone area, as illustrated in F11 and F12 in FIG. 5B, and particularly in cases where both a text area and a photographic area are present on a single document, the areas are distinguished from each other. For example, when data on a read image reflects a sharp change from a high-density image (e.g., in the color black) to a low-density image (e.g., in the color white), the image is judged to be of a text document. The document is also judged to be a text document when sharp density gradients are present in the read image area on the document as illustrated in F11 in FIG. 5B. In contrast, in the case of photos, the density gradients are not sharp, but rather smooth, as illustrated in F12 in FIG. 5B, on which the images are judged to be tone images.

In view of the foregoing, a second embodiment of the invention will now be described with reference to the control flow chart shown in FIG. 5A. The control flow chart is different from that in FIG. 1A with only respect to the processing in step S12. The other processing steps are carried out in the same manner as in FIG. 1A, and therefore, an explanation of those steps is omitted. Specifically, step 11 and step S13 through S19 in FIG. 5A are exactly the same as steps S1 and S3 through S9.

Here, if the test-copying mode for original images has been set or an operation therefor has been conducted, the operation of reading the original images initiates (step S1), and image are segmented into areas based on the read image data to produce histogram data for the respective images segmented. Those data together are stored in the memory 73 (step S12–S13).

In step 12 during image-area segmentation, in cases where both a text area and a photograph area are present on a single document, the image areas are grouped. As described earlier, for example when data on a read image of one line reflects a sharp change, the image is judged to be of a text area. On the other hand, when the density gradients in the image are smooth, the image is judged to be of a photographic area. This completes the judgement whether the image is of a text area or of a photographic area. Thus, the image area segmentation such as that between the text area and the photographic area can be carried out, and histogram data regarding the segmented image data is prepared when image areas to be grouped are present in a single document.

If histogram data is prepared on a document basis, a characteristic image cannot be extracted when both a text image and a photo image are present on a single document. This is because, for example, the features of an image in the text area, if present, are canceled by the presence of a photographic image in histogram data when it is produced on a document basis, and the features of the image to be extracted are impaired or become null, thus excluding the image from selection. In order also to avoid this, a text area and a photographic area are distinguished from each other, and histogram data is produced for each of the distinguished image areas. However, when the images present on a single document are not such images as texts or photos which can be distinguished from each other, the images cannot be grouped, and histogram data is produced on a document basis.

When the image areas are grouped and histogram data is produced for each group of the distinguished image areas, information about the image area groups and the histogram data are stored together with the read-image data produced on a document basis, and when the foregoing operations have been performed for all the documents to be copied, the process proceeds to step S14 and then to S15, where an image to be test-copied is selected. As described above regarding the first embodiment, an image with a large difference in density (F13) is selected on the basis of the histogram data produced for each of the distinguished image areas. In the case of a text document, an image with a large difference in density in a particular area (F14) is selected. Otherwise, an image with halftone areas (F15) is selected. The selection, that is, the extraction of features is desirable to be performed of an image with clearer density gradations in order to help the operator adjust the image density; the operator can easily envisage the density profiles of the actual hard copies and easily set the conditions so as to output the hard copies conditioned as desired by referring to the output test copy of the selected image.

On the other hand, when it is impossible to satisfactorily capture the features of the selected image on the basis of a particular image area thereof, plural images, including a text and an image with clear density gradations, are selected and partially extracted to be synthesized for test copying on a single sheet of recording paper. More specifically, images having features as illustrated in F14 and F15 are selected and synthesized. Here, when the image areas are segmented, the respective groups of the segments are synthesized into separate portions. When the two characteristic images are on separate documents, the original images are divided into halves and synthesized so as to allow test copying on a single sheet of recording paper.

The synthesis of the images is performed by synthesizing the data of the images selected by the CPU 74, by the image processing unit 71, storing the processed image data in the memory 73 and outputting the image data via the image data output unit 72. The image processing is of course performed depending on the set density.

Since the outputting helps the operator envisage the difference in density by visually checking the two types of images, the density can be easily adjusted with the setting keys 114 provided on the control panel 101 for adjustment of the image density.

Here, referring to FIG. 5A, when an image to be output for test copying is selected from the feature-extracted images, two different types of images may be selected at all times in step S15, without being restricted to only one type. In order to accomplish this, in step S15 in the control flow chart of FIG. 5A, different characteristic images of both a text document and a photographic document, for example, are selected and output on the same sheet of recording paper, thus making it easier and more reliable to envisage the density profiles of the actual hard copies. Therefore, in step S15 of selecting images to be output for test copying, images of at least both a text document and a photographic document are selected, without being restricted to only one type.

Since two different characteristic images are formed on a single sheet of recording paper at all times, it is easier to envisage the image densities. More specifically, test-copying only an image of a text document serves to envisage only the density profiles of the high-density areas, and cannot envisage the density profiles of the halftone areas which, however, are easily envisaged on the basis of the tone image test-copied in the case described above. Particularly, outputting on a single sheet of recording paper facilitates the envisagement.

Here, in cases where two different types of characteristic images cannot be test-copied on a single sheet of recording paper, the characteristic images on two separate documents may of course be synthesized and output to a single sheet of recording paper.

Third Embodiment

According to the embodiments described above, the features of the image selected on the basis of the read-image data are extracted to produce histogram data. Here, when the features of the characteristic image are extracted depending on the mode selected by the operator, the adjustment may be performed in a more reliable and easier manner matching the mode.

Figure 6A:
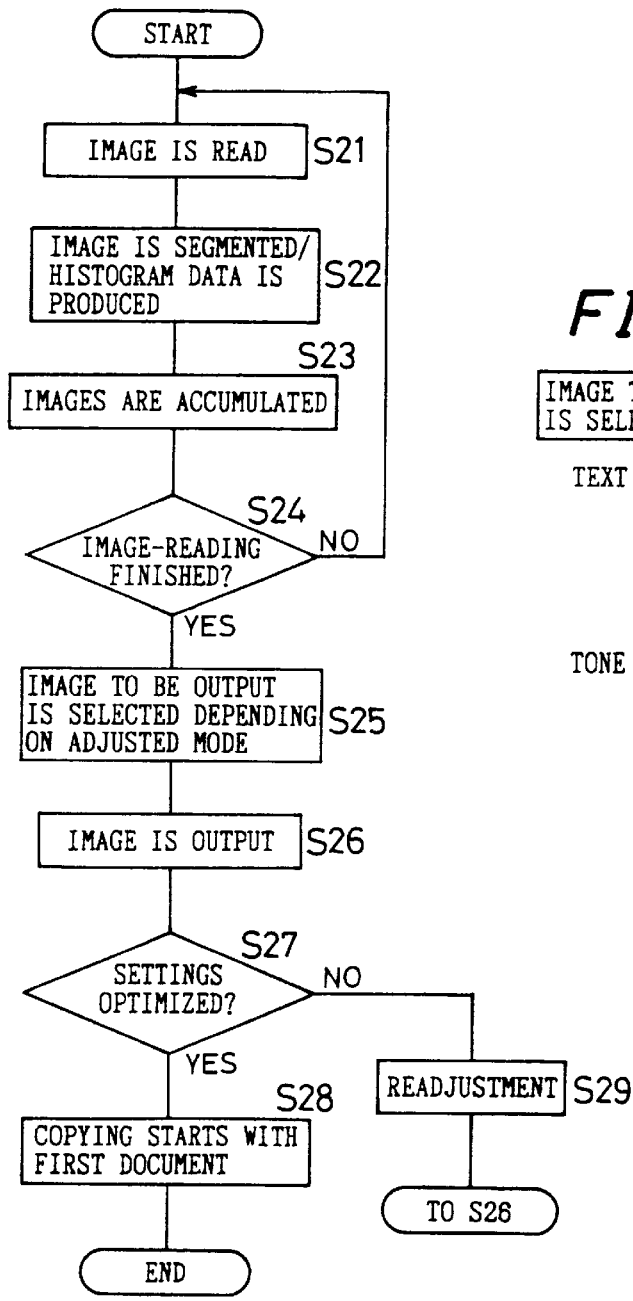
FIG. 6A is a control flow chart illustrative of control operation according to a third embodiment of the invention.

FIG. 6A, an illustration of the control flow chart, is different from FIG. 5A only regarding the processing in step S25. The other processing steps are carried out in the same manner as in FIG. 5A. Particularly, steps S21 through S24 and steps S26 through S29 are exactly the same as steps S11 through step S14 and steps S16 through S19 in FIG. 5A, and therefore an explanation of those steps is omitted.

Upon completion of reading images of all the documents, a characteristic image is selected in step S25, and a test copy of the selected image is output to recording paper (step S26). Here, the selection of the characteristic image is performed depending on the set mode.

For example, the operator of the copying machine 1 selects a mode appropriate to form an image, depending on whether the image is of a text document or a photographic document, for example. In cases where the document to be copied is a text document, the text mode is of course selected, whereas the photographic mode is selected when a tone photographic document is included. Particularly, in the case of text documents, since there are no halftone problems, all that is needed is to form high-density areas, which is accomplished by image processing which involves the application of a predetermined volume of toner with the image-processing apparatus. That is, the read-image data is subjected to image processing so that the images are read in a high-density state, the data read from the images is located in the text areas of the read-image data, and image fractions dotted around the areas are eliminated. In contrast, in the case of the photographic mode, the image processing is performed so that the halftone areas have no sharp density gradation for reproduction of clear halftone areas as well, and the image segments are clearly distinguished from each other.

When the text mode is selected in step S25 in such a manner of selecting a mode as described above, the features of text areas provided by segmenting the images are extracted to produce histogram data for the respective text areas, on the basis of which an image with sharp density gradation and with a low-density area is selected, as described above. For example, an image as illustrated in F21 in FIG. 6B, which has sharp density gradation due to a text area and has a low-density area, is selected.

Figure 6B:
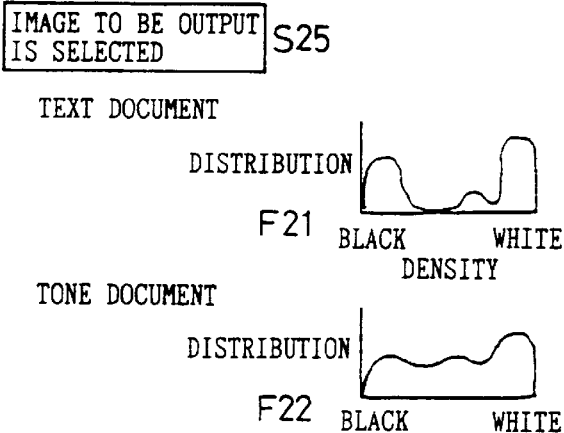
FIG. 6B shows graphs illustrative of the histogram data which is used in step S25 in the flow chart of FIG. 6A to select an image to be output.

When the photographic mode (halftone mode) is selected, an image is selected by referring to histogram data as illustrated in F22 in FIG. 6B which reflects that the density of an area provided by the image segmentation uniformly varies over a wide range.

A test copy of any one of the images selected in step S25 is output to recording paper (step S26). The operator visually checks the output image and adjusts the density to provide a desired image density. Since the image is selected in this way depending on the selected mode, and an image accurately reflecting the image density which matches the mode may be test-copied, the setting operation, including adjustment of the density, may be performed while referring to the output image, and this allows an image matching the selected mode to be more faithfully and easily reproduced.

The foregoing first through third embodiments illustrate the adjustment of the image density. Without being restricted to the described adjustment of the image density, the invention may be applied to reproduction of multi-colored images as well, in which case the features of characteristic images are extracted, an image which is selected from the characteristic images is test-copied, and the output test copy thereof is visually checked to make it easier to adjust the color. For example, when a multi-colored image is read, histogram data is produced on a primary-color basis and/or for each of the hues to extract the features of the image, and an image having the most enhanced primary colors is selected and output as a hard copy. Referring to this hard copy, the densities of yellow, magenta and cyan may be easily adjusted on the basis of the densities of the enhanced colors, the hues, etc.

Also, as described above, a document bearing an image with sharp density gradation and with both a high-density area and a low-density area may be selected and output for test copying. Further, when a document with a density greatly varying over a wide range is selected and output for test copying, not only the color adjustment but also the density adjustment may be performed with ease. In addition, the two types of images may be concurrently test-copied, as described above.

The invention, though described above with reference to the embodiments applied to a copying machine, may of course be applied to printers as well. More specifically, the invention may be similarly applied to such a case where conditions are set for outputting image information as a hard copy which has been produced with a personal computer, word-processor or the like and captured as image data. The image input means is the scanner 2 in the case of the copying machine 1 illustrated in FIG. 2, and a personal computer or the like in the case of printers. When the image information is input as image data and subjected to image processing by an image-processing apparatus as illustrated in FIG. 3, an image is selected on the basis of the histogram data which has been produced by extracting the features of the images, and is output in advance for test copying.

As described above, the image-forming apparatus according to the invention allows the operator to easily set the image forming conditions as desired while visually checking the image formed on recording paper. Here, since a characteristic image is selected from those to be actually copied, on the basis of the extracted features thereof and the adjustment may be performed while visually checking the test-copied image, the operator can easily obtain images conditioned as desired.

Since an image which has large density gradation and is easy to determine the density profile thereof, an image with a density varying over a wide range or the like is selected as the characteristic image and output in advance for test copying, the image density, etc. may be easily conditioned as desired even if the operator is not skilled.

In addition, when the images are segmented and the features of the respective image segments are extracted, the density profile, for example, may be envisaged in a easier and more accurate manner, thus making it easier to set the conditions for forming the images. In addition, when the images are grouped and two different types of characteristic images are selected and output, the images may be compared with each other, and this not only makes it easier to set the conditions for forming the images, but also allows the images conditioned as desired to be obtained by easier operation in a shorter time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image-forming apparatus comprising:

image input means for inputting image data from a plurality of images;

storage unit for successively storing image data for each of said plurality of images input by the image input means;

an operating unit for setting the conditions for forming images;

image-forming means for forming images on recording paper, the image-forming means including image-processing means for processing the input image data stored in the storage unit to output image data to be output under the image-forming conditions set by the operating unit;

feature-extracting means for extracting the features of the said plurality of images from the input image data input by the image input means;

image-selecting means for automatically selecting, on the basis of the extracted features of the images, characteristic image data from at least two of said images to be output,; and image output means for reading the image data selected by the image-selecting means from the storage unit and outputting the selected images on recording paper as a test image prior to commencement of forming images on recording paper by image-processing all the input image data stored in the storage unit.

2. The image-forming apparatus according to claim 1, wherein the feature-extracting means produces histogram data per each image data, and extracts the features of each image data from the histogram data.

3. The image-forming apparatus according to claim 2, wherein the image-selecting means selects an image with a variety of density gradations which has both a high-density area and a low-density area, an image with density gradations extending over a wide range, or an image with a variously patterned area, on the basis of the histogram data reflecting the features of the images which are extracted by the feature-extracting means.

4. An image-forming apparatus comprising:
    image-reading means for reading original images and capturing the image data:
        a storage unit for storing the data on the images read by the image-reading means per original;
        an operating unit for setting the conditions for forming images;
        image-forming means for successively reading the image data stored in the storage unit and forming images on recording paper under the image-forming conditions set by the operating unit;
        image-segmenting means for locating a plurality of areas characteristic of different image portions per data on the images read by the reading means, and segmenting the areas per data on the images;
        image-selecting means for selecting at least two particularly characteristic image segments on the basis of the features of the image segments provided by the image-segmenting means; and
        image output means for reading the image portions selected by the image-selecting means from the storage unit and outputting the selected image portions by forming the image on recording paper prior to commencement of forming on recording paper images of all the image data stored in the storage unit.

5. The image-forming apparatus according to claim 4, wherein the image-segmenting means includes means for producing histogram data on the segmented area per data on the images.

6. The image-forming apparatus according to claim 5, wherein the image-selecting means selects an image with a variety of density gradations which has both a high-density area and a low-density area, an image with density gradations extending over a wide range, or an image with a variously patterned area, on the basis of the histogram data reflecting the features of the images which are extracted by the feature-extracting means.

7. The image-forming apparatus according to claim 4 or claim 6, wherein the image-selecting means selects at least two image segments with different characteristics from the characteristic image segments located by the image-segmenting means, and the image output means outputs the image segments in the form of images formed on a single sheet of recording paper.

8. The image-forming apparatus according to claim 1 or claim 4, wherein the image-selecting means selects an image depending on a preselected image-forming mode including a text mode or photographic mode.

9. Apparatus as set forth in claim 1 wherein said plurality of images comprises a plurality of documents.

* * * * *